US011397463B2

(12) United States Patent
Schwarz et al.

(10) Patent No.: US 11,397,463 B2
(45) Date of Patent: Jul. 26, 2022

(54) DISCRETE AND CONTINUOUS GESTURES FOR ENABLING HAND RAYS

(71) Applicant: MICROSOFT TECHNOLOGY LICENSING, LLC, Redmond, WA (US)

(72) Inventors: Julia Schwarz, Redmond, WA (US); Sheng Kai Tang, Redmond, WA (US); Casey Leon Meekhof, Redmond, WA (US); Nahil Tawfik Sharkasi, Woodinville, WA (US); Sophie Stellmach, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/297,237

(22) Filed: Mar. 8, 2019

(65) Prior Publication Data

US 2020/0225736 A1      Jul. 16, 2020

Related U.S. Application Data

(60) Provisional application No. 62/791,765, filed on Jan. 12, 2019.

(51) Int. Cl.
*G06F 3/01* (2006.01)
*G06T 19/00* (2011.01)
*G06F 3/03* (2006.01)

(52) U.S. Cl.
CPC .............. *G06F 3/011* (2013.01); *G06F 3/017* (2013.01); *G06F 3/0304* (2013.01); *G06T 19/006* (2013.01)

(58) Field of Classification Search
None
See application file for complete search history.

(56) References Cited

U.S. PATENT DOCUMENTS 8,854,433 B1   10/2014   Rafii
9,489,053 B2   11/2016   Latta et al.
(Continued)

FOREIGN PATENT DOCUMENTS

CN        106598233 A       4/2017

OTHER PUBLICATIONS

Title: About Cursors. Publication Date: May 31, 2018. Publisher: Microsoft. URL: https://docs.microsoft.com/en-us/windows/win32/menurc/about-cursors (Year: 2018).*

(Continued)

*Primary Examiner* — Matthew Ell
(74) *Attorney, Agent, or Firm* — Workman Nydegger

(57) ABSTRACT

Systems and methods are provided for selectively enabling or disabling control rays in mixed-reality environments. In some instances, a mixed-reality display device presents a mixed-reality environment to a user which includes one or more holograms. The display device then detects a user gesture input associated with a user control (which may include a part of the user's body) during presentation of the mixed-reality environment. In response to detecting the user gesture, the display device selectively generates and displays a corresponding control ray as a hologram rendered by the display device extending away from the user control within the mixed-reality environment. Gestures may also be detected for selectively disabling control rays so that they are no longer rendered.

11 Claims, 8 Drawing Sheets

(56) References Cited

U.S. PATENT DOCUMENTS

| | | | |
|---|---|---|---|
| 2012/0050157 A1* | 3/2012 | Latta | G06F 3/017 |
| | | | 345/156 |
| 2012/0223882 A1* | 9/2012 | Galor | G06F 3/011 |
| | | | 345/157 |
| 2013/0335301 A1* | 12/2013 | Wong | G02B 27/0093 |
| | | | 345/8 |
| 2015/0187143 A1 | 7/2015 | Mere et al. | |
| 2016/0027218 A1 | 1/2016 | Salter et al. | |
| 2016/0170603 A1 | 6/2016 | Bastien et al. | |
| 2016/0239080 A1 | 8/2016 | Marcolina et al. | |
| 2017/0228921 A1 | 8/2017 | Buhlmann et al. | |
| 2019/0050062 A1* | 2/2019 | Chen | G06F 3/017 |
| 2019/0146222 A1* | 5/2019 | Hiroi | G06F 3/012 |
| | | | 345/8 |
| 2019/0188895 A1* | 6/2019 | Miller, IV | G06F 3/011 |
| 2019/0212827 A1* | 7/2019 | Kin | G06F 3/04815 |
| 2019/0391662 A1* | 12/2019 | Yokokawa | G06F 3/013 |

OTHER PUBLICATIONS

"How do I turn off the virtual hands and keyboard?", Retrieved from: https://s.typingclub.com/help/turn-off-virtual-hands-and-keyboard.html, Dec. 27, 2018, 3 Pages.

Bellarbi, et al., "Design and Evaluation of Zoom-based 3D Interaction Technique for Augmented Reality", In Proceedings of Virtual Reality International Conference-Laval Virtual, Mar. 22, 2017, 5 Pages.

Marquardt, et al., "The Continuous Interaction Space: Interaction Techniques Unifying Touch and Gesture On and above a Digital Surface", In Proceedings of the 13th IFIP TC 13 International Conference on Human-Computer Interaction—vol. Part III, Sep. 5, 2011, 16 Pages.

"International Search Report and Written Opinion Issued in PCT Application No. PCT/US2019/068460", dated Mar. 20, 2020, 13 Pages (MS# 405734-WO-PCT).

* cited by examiner

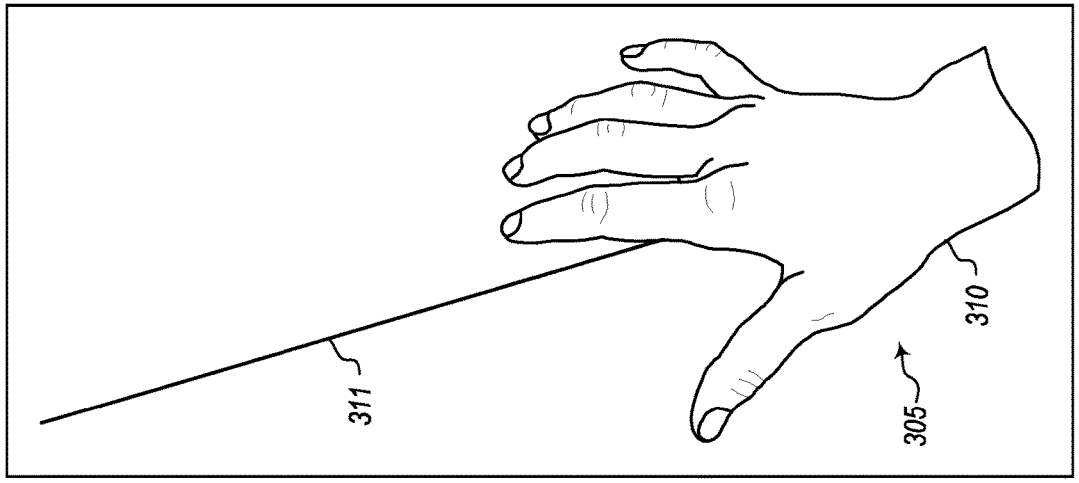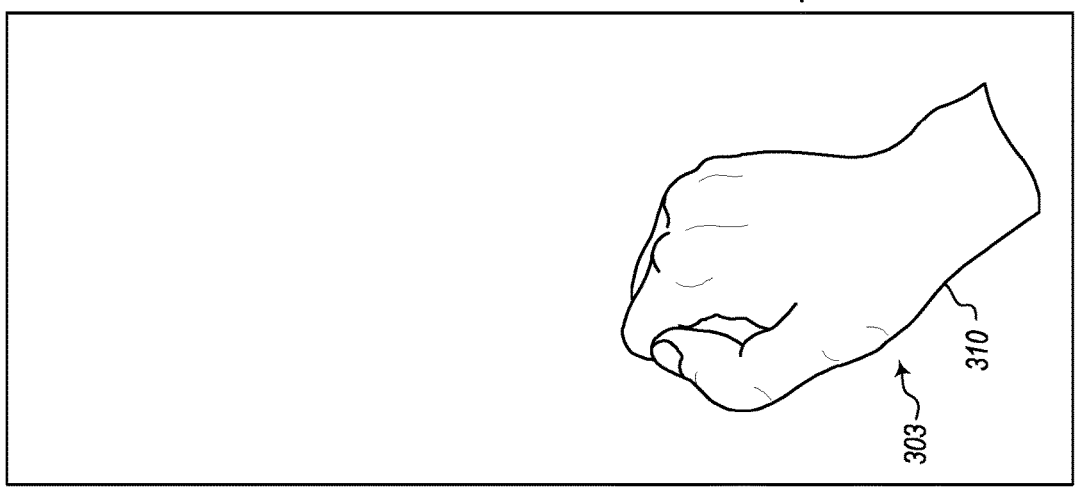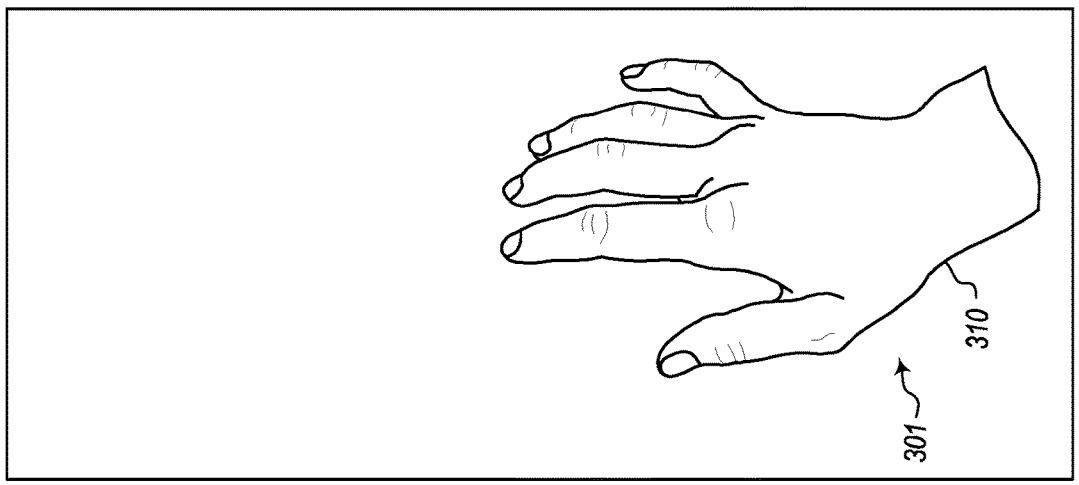
FIG. 3

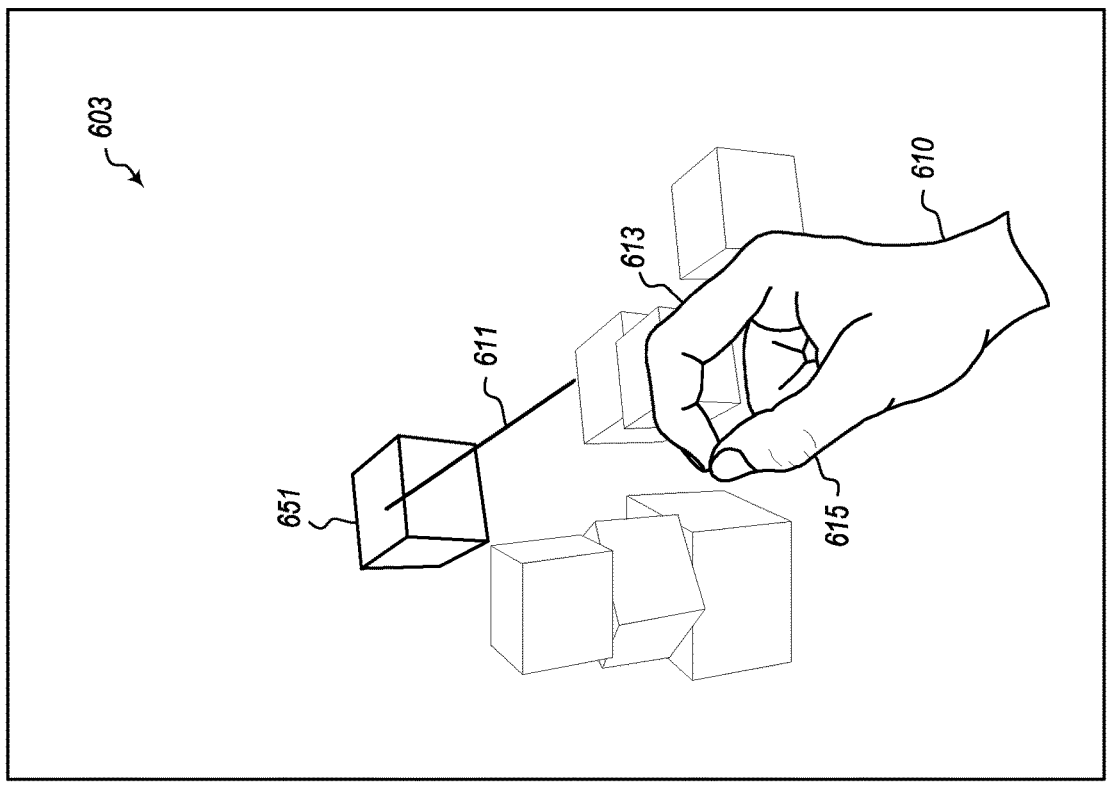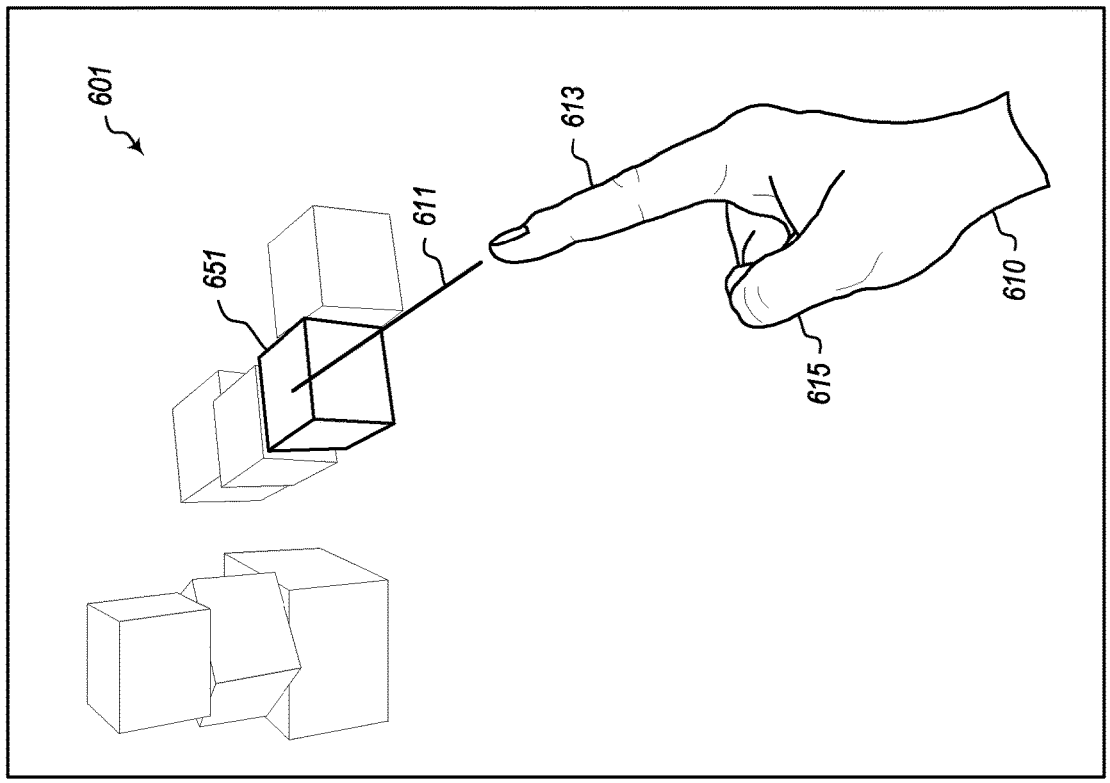
FIG. 6

DISCRETE AND CONTINUOUS GESTURES FOR ENABLING HAND RAYS

CROSS-REFERENCE TO RELATED APPLICATIONS

This application claims the benefit of and priority to U.S. Provisional Patent Application Ser. No. 62/791,765 filed on Jan. 12, 2019 and entitled "DISCRETE AND CONTINUOUS GESTURES FOR ENABLING HAND RAYS," which application is expressly incorporated herein by reference in its entirety.

BACKGROUND

"Augmented reality" typically refers to virtual experiences where virtual objects are visually placed within the real world, such that a user experiences virtual content and the real world simultaneously. In contrast, "virtual reality" typically refers to immersive virtual experiences where a user's view of the real-world is completely obscured and only virtual objects are perceived. Typically, "mixed-reality" refers to either augmented reality or virtual reality environments. However, for the sake of clarity and simplicity, the terms mixed-reality, virtual reality, and augmented reality are used interchangeably herein.

Mixed-reality systems are typically configured as head mounted displays that generate and/or render the mixed-reality content. Continued advances in hardware capabilities and rendering technologies have greatly increased the realism of virtual objects and scenes displayed to a user within mixed-reality environments. For example, virtual objects can be placed within a mixed-reality environment in such a way as to give the impression that the virtual object is part of the real world.

Some mixed-reality systems have been configured to track the movement of a user's body parts, such as the user's hands, as the user interacts with virtual objects in the mixed-reality environment. Furthermore, some mixed-reality systems are configured to replicate the user's body parts within the mixed-reality, such that the user is able to view and control virtualized body parts within the mixed-reality environment. For instance, a user's hand can be presented as a hologram occlusion that moves within the mixed-reality environment in direct response to the movements of their own real-world hand. As the user moves their real-world hand, the hand occlusion is also moved, such that it is capable of interacting with other virtual objects within the mixed-reality environment.

Many mixed-reality systems allow users to use their body parts (or tools or other controllers manipulated thereby) to interact with virtual objects in the mixed-reality environment. For instance, some mixed-reality systems allow a user to use their hands (or virtual representations thereof) to grab, push, pull, pick up, slide, press, rotate, or otherwise interact with virtual objects or virtual input elements (such as virtual buttons) within the mixed-reality environment.

Furthermore, some mixed-reality systems allow for users to interact with virtual objects or input elements at a distance, such as where the virtual content lies outside of the reach of the user. Various methods exist for facilitating such distanced interaction. One method includes implementing a control ray that extends from the user's controller (e.g., the user's hand) and may be directed to content that is remotely located from the user in the mixed-reality environment. When the control ray impinges on a distant virtual object or input element, the user may perform gestures or other commands to interact with the distant virtual content.

Control rays, however, can be distracting to users, while being immersed in the mixed-reality environment, particularly when users are interacting with near virtual content, operating applications within the mixed-reality environment, or are gesticulating while talking. Furthermore, control rays may result in unintended interaction with virtual content. For example, a user may intend to interact with a nearby virtual box, but the control ray may inadvertently trigger interaction with a distant virtual input element instead of the nearby virtual box. Other instances of unintended interaction with distant virtual content may occur with existing control ray configurations, such as, by way of example, when the user is typing on a nearby keyboard, screwing a nearby cap on, or picking up a nearby object, and so forth.

Accordingly, there is an ongoing need in the field of mixed-reality for providing improved user control ray functionality for facilitating a manner in which users interact with distant and proximate virtual content in mixed-reality environments.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include methods and systems for selectively enabling or disabling control rays in mixed-reality environments.

In some instances, a mixed-reality display device presents a mixed-reality environment to a user which includes one or more holograms. The display device then detects a user gesture input associated with a user control (which may include a user's hand or another part of the user's body) during presentation of the mixed-reality environment. In response to detecting the user gesture, the display device selectively generates and displays a corresponding control ray as a hologram rendered by the display device extending away from the user control within the mixed-reality environment.

In some embodiments, a mixed-reality display device presents a mixed-reality environment which includes one or more holograms to a user. The device obtains a control ray activation variable associated with a user control (which may include a part of the user's body). Further, in response to determining that the control ray activation variable exceeds a predetermined threshold, the device selectively enables display of a control ray within the mixed-reality environment, which is rendered as a hologram extending away from the user control within the mixed-reality environment. The control ray activation variable is based at least in part on a pose or gesture associated with the user control.

In some embodiments, a mixed-reality display device presents a mixed-reality environment to a user with a mixed-reality display device. The device then displays a control ray comprising a hologram within the mixed-reality environment, which is associated with a user control, and which may include a part of the user's body. Additionally, the device detects a user gesture input during presentation of the mixed-reality environment, and in response, selectively terminates the display of the control ray.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 3 illustrates a user hand in different poses/gestures and in which one of the poses/gestures corresponds to a control ray extending away from a user's hand;

FIG. 6 illustrates an embodiment in which a user hand has a control ray extending away from it to interact with an object in a mixed-reality environment;

DETAILED DESCRIPTION

Figure 1:
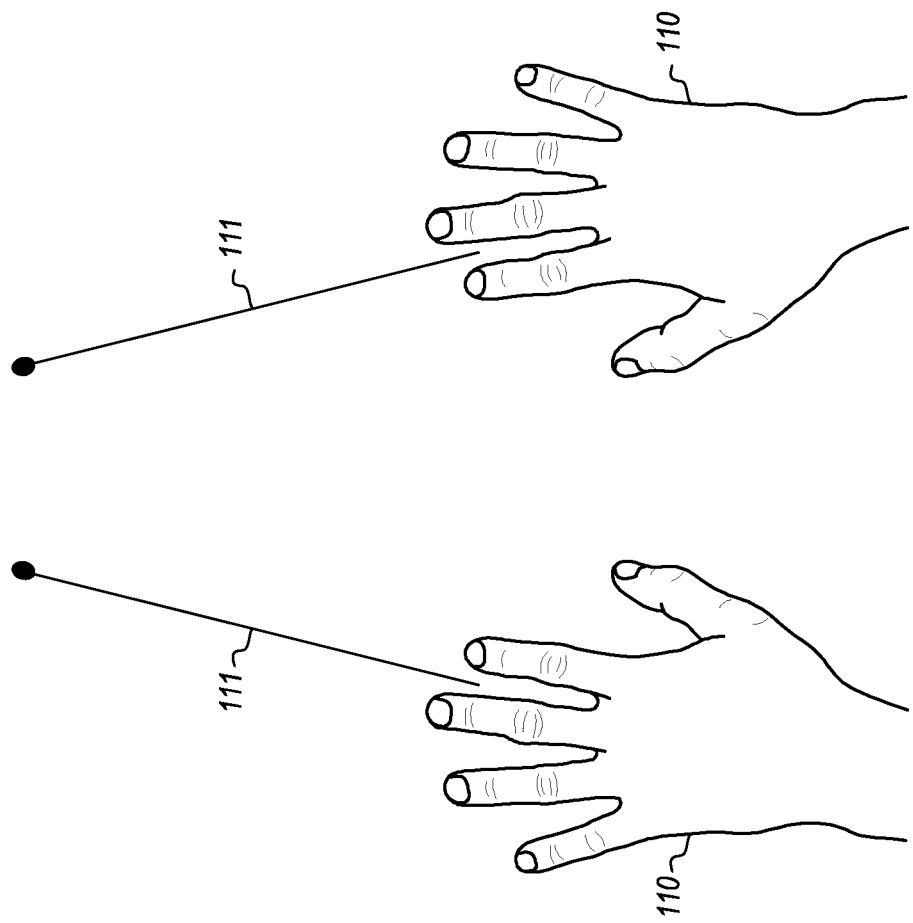
FIG. 1 illustrates an exemplary depiction of control rays (embodied as hand rays) for a mixed-reality environment.

At least some embodiments described herein relate to mixed-reality systems configured to selectively enable control rays in mixed-reality environments.

In some instances, the control rays are embodied as ray holograms extending away from a user controller, such as a user's finger, hand, or another body part, or a virtual representation thereof, within mixed-reality environments.

Control rays extending away from a controller can facilitate the user controller to interact with virtual content that would ordinarily be outside of the controller's reach. Control rays may also serve other purposes such as enabling users to point at objects and to direct other users who can see the control rays to view the directional orientation of a user's focus (which may be indicated by the directional orientation of the control ray), for instance.

Although control rays provide several benefits within mixed-reality environments, they can create some undesirable consequences. For instance, a control ray can be distracting when users are interacting with near virtual content, operating applications within the mixed-reality environment, or are gesticulating while talking. In particular, the control ray extending from a user's hand in such a situation may be randomly projected throughout a mixed reality environment without intent. This can be particularly problematic when the control ray has enabled functionality, in that a user may unintentionally interact with and execute commands corresponding to random objects in the mixed-reality environment. By way of example, a user may intend to interact with a nearby virtual button, but the control ray may inadvertently facilitate interaction with a distant virtual box instead of the nearby virtual button. In another example, a user may inadvertently cause interaction with distant virtual content while performing other actions intended for interaction with nearby virtual content, such as typing on a nearby keyboard, screwing a nearby cap on, or picking up a nearby object.

The foregoing problems can be particularly pronounced for embodiments in which the control rays are continuously rendered at all times. It can also be problematic for systems that continuously run control ray processes but only render the control rays when the rays impinge on an interactable virtual object in the mixed-reality environment, in that additional/unnecessary computation processing is expended and unintended ray interactions can still occur.

The disclosed embodiments may be utilized to address some or all of the aforementioned challenges with the use of user control rays in mixed-reality environments. In some embodiments, a mixed-reality system detects a user gesture input associated with a user control and, in response, generates and/or displays a corresponding control ray. In some embodiments, a mixed-reality system obtains a control ray activation variable associated with a user control and, in response to determining that the control ray activation variable exceeds a predetermined threshold, selectively enables display of a control ray. In yet other embodiments, a mixed-reality system terminates the display of a control ray upon detecting a triggering user gesture, user pose, or control ray activation variable value.

Those skilled in the art will recognize that the embodiments disclosed herein may provide significant benefits over conventional systems and methods for implementing and/or enabling control rays in mixed-reality environments. For example, some disclosed embodiments afford users more control (by gestures, poses, etc.) over when control rays become enabled/displayed/activated, thus avoiding problems associated with control rays being enabled at all times (e.g., distraction, unintended virtual object interaction). In another example, because some disclosed embodiments allow for selective enabling and/or disabling of control rays in mixed-reality environments, processes associated with targeting for control rays and rendering control rays need not be run at all times, even in the background, thus saving on processing resources. Additionally, the embodiments disclosed herein may allow for a more intuitive and desirable user experience with respect to hand ray activation/enablement.

Having just described some of the various high-level features and benefits of the disclosed embodiments, attention will now be directed to FIGS. 1 through 7. These figures illustrate various functionalities, examples, supporting illustrations, and methods related to selectively enabling control rays in mixed-reality environments. Subsequently, attention will be directed to FIG. 8, which presents an example computer system that may be used to facilitate the disclosed principles.

FIG. 1 illustrates an exemplary depiction of control rays extending from a user control for a mixed-reality environment. As shown, the user controls in this embodiment are a user's hands 110, and control rays embodied as hand rays 111 extends away from the user's hands 110. Among other purposes, the control rays 111 may impinge on virtual objects and/or virtual input devices in the mixed-reality environment to enable users to interact with such virtual content. The directional orientation of the control rays, extending away from the user's hands, may be based on an axial alignment with particular fingers, an axial alignment with the user's forearms, or other based on other alignments. In some instances, for example, the control rays may emanate from one or more particular portion(s) of the user's hands (e.g., finger, palm, other), and may extend to and terminate at a point of focus associated with a user's gaze (as detected by a gaze detector), irrespective of the orientations of the user's hands.

Aside from the specific implementation illustrated in FIG. 1, it will be appreciated alternative configurations are also possible. For example, the control rays need not extend from both of a user's hands 110, but may extend from only one hand in order to enable the other hand to perform nearby or other actions without a potentially distracting rendering of a control ray. In addition, those skilled in the art will recognize that the user control is not limited to the user's hand 110, but may be embodied as any object within the control of a user, such as a user-held control wand (e.g., a control ray may extend from a tip of the control wand), or an object worn by the user, such as a bracelet or ring, or another device, from which the control ray(s) may emanate when triggered in accordance with the principals of this disclosure.

The following embodiments are discussed in the context of a mixed-reality environment which may be presented by a mixed-reality system (e.g., computer system 800 illustrated in FIG. 8) where the mixed-reality environment includes one or more holograms presented to a user at a mixed-reality display device and where the user may interact with the one or more holograms.

In some instances, a user-operated control (e.g., a user's hand) for interacting with the holograms/virtual objects in the mixed-reality environment may be tracked by the mixed-reality system (see FIG. 8 and the relevant discussion of sensors 820 and 830) such that the mixed-reality system detects movement, pose, and other characteristics of the user control(s). In response to detecting certain movement, poses, and/or other variables/values based on such movement and/or poses of the user control, the mixed-reality system may execute certain commands and/or input to shape the user experience, such as the disclosed selective activation and use of control rays within the mixed-reality environment.

Figure 2:
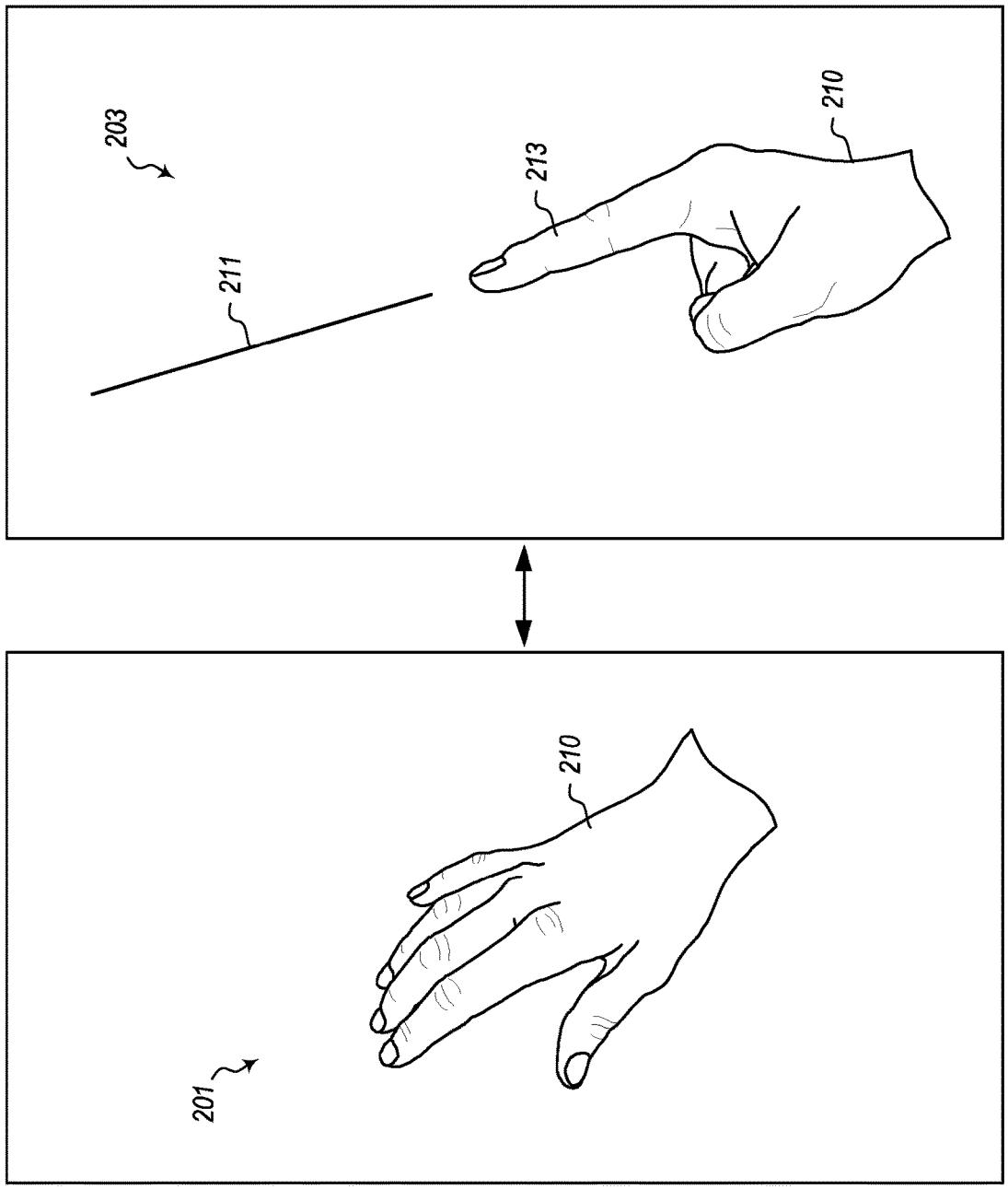
FIG. 2 illustrates a user hand in different poses/gestures and in which one of the poses/gestures corresponds to a control ray extending away from a user's hand.

Attention is now directed to FIG. 2, which illustrates an embodiment in which a mixed-reality system selectively enables/triggers the display of a control ray in a mixed-reality environment based on a gesture or pose of a user control (e.g., a user hand). FIG. 2 includes two poses/gestures of a user's hand 210. In the pose 201, the user control (implemented here as user's hand 210) is in an open position, without a control ray extending from any part thereof. In the pose 203, the user's hand 210 is in a position wherein only the index finger 213 is extended forward (with the rest of the fingers closed to the palm of the hand 210), with a control ray 211 extending from the tip of the extended index finger 213. The bidirectional arrow between the pose 201 and the pose 203 of FIG. 2 is intended to suggest a transitional relationship between the two poses, in particular, such that the user may change their hand positioning from the pose depicted in pose 201 to the pose depicted pose 203 and vice versa to selectively trigger the activation/display of the control ray 211 (shown in 203) or deactivation/omission of the control ray 211 (shown in 201).

Even more particularly, it will be appreciated that the disclosed embodiment facilitate control over control rays that are rendered in mixed-reality environments, by enabling mixed-reality systems to selectively enable generation and display of control rays in response to detecting certain user gestures/gesture input associated with user controls (e.g., user hands, fingers and other objects).

With specific reference to FIG. 2, the mixed-reality system is configured to selectively enable a control ray 211 (which is visible through a display device of the mixed-reality system to a user) only upon detecting that a user control (here, the user's hand 210) is in a predefined pose, as detected by one or more sensor associated with the mixed-reality system. In FIG. 2, the predefined pose in this embodiment is one that includes a user's index finger 213 extended away from the user's hand 210 while the other fingers on the user's hand 210 are in a closed position. Upon making such a detection, the mixed-reality system of FIG. 2 triggers operations for selectively rendering a control ray 211 extending away from the tip of the user's index finger 213 (either the user's actual finger or a hologram representation of the user's finger) as a control ray hologram in the mixed-reality environment.

Thus, in pose 201 of FIG. 2, the mixed-reality system detects that the user's hand 210 is in a pose that does not trigger the enablement of a control ray 211 (i.e., several of the user's fingers are extended forward), and therefore the system renders no control ray when the user's hand 210 is in such a pose. In pose 203 of FIG. 2, in contrast, upon detecting that the user has positioned their hand 210 with only the index finger 213 extending forward, the mixed-reality system renders a control ray 211 extending away from the tip of the user's index finger 213. After rendering the control ray 211, if the system subsequently detects that the user opens their hand 210 again to correspond to the position shown in pose 201 of FIG. 2 (or another position wherein the index finger is not the only finger extended forward), the system will terminate the operation/display of the control ray 211.

Accordingly, in FIG. 2, the control ray 211 is only temporarily/selectively enabled and/or displayed when the user control (e.g., hand 210) is in a desired predefined pose, which may help to ameliorate problems associated with control rays being enabled at non-optimal times and/or control ray processing (e.g., location/orientation tracking) applying unnecessary computational burdens when running in the background (even when the control ray is not displayed).

Although, in the current embodiment of FIG. 2, only one control ray triggering pose/gesture is shown (i.e., the pointing index finger pose/gesture), and although only one control ray display configuration is shown (i.e., the control ray extending away from the index finger), those skilled in the art will appreciate that these depictions are non-limiting. For example, other poses/gestures may also trigger the activation/display of a control ray such as when two or more fingers are extended, when the palm faces forward, when the hand is in a fist, when only the pinky is extended, and/or when a controller (finger, hand, worn object, held object) is rotated about an axis a predefined rotation amount, and/or when the controller is moved in a certain pattern, and/or when the controller is moved with a certain velocity, and/or when the controller assumes the position of any predefined pose/gesture that is associated with a triggering function for generating and/or rendering the control ray(s), etc. Furthermore, the control ray need not be rendered extending away from an extended finger, but may be rendered from another location, such as from the middle of a user's field of view, or another centralized location corresponding to the triggering pose (e.g., from another part of the user's hand or another object, as described above).

In some instances, different gestures associated with a same controller and different gestures associated with different controllers are mapped to different types of control rays that each have different functionality and/or rendering properties. For instance, a first type of control ray associated with a first gesture and a first controller may render the first type of control ray with a first set of display properties (e.g., a particular color, thickness, transparency, taper, animation, or other display attribute) and/or functionality (e.g., selection functionality, pointing only functionality, modification to selected object functionality, and so forth) within the mixed-reality environment, while a second gesture applied with the first controller may render a second type of control ray having a second set of display properties and/or functionality that is different than the first set of display properties and/or functionality. Likewise, additionality control ray types having different display properties/functionality within the mixed-reality environment may also be associated with different gestures applied with the same controller.

Similarly, a same gesture applied to different controllers (e.g., different fingers, hands, and/or other objects) may trigger different types of control rays having different display properties/functionality within the mixed-reality environment.

Additionally, a same gesture applied to a same controller in a first mixed-reality environment and/or a first mixed-reality environment context may trigger the generation/rendering of a first type of control ray while the same gesture applied to the same controller in a second mixed-reality environment and/or a second mixed-reality environment context (even if in the first mixed-reality environment) may trigger the generation/rendering of a second type of control ray.

Different types of control rays can also be associated with different types of users based on stored/modified settings, such that a first user causing a first gesture with a first controller type (e.g., their hand) may be associated with and trigger a first type of control ray that is different than a second type of control ray that is associated with and triggered by a second user applying the same first gesture with the same first controller type (e.g., their hand).

It will be appreciated that any combinations of the foregoing embodiments may also be used to associate/map different types of control rays (having different display properties and/or functionalities) to different types of users, controllers, environments, contexts, and/or gestures (wherein the term gestures may be a single pose or any combination and sequenced pattern of a plurality of poses).

The foregoing associations/mappings for the different types of control rays and mixed-reality environments and contexts may be maintained in a table or other structure stored in the mixed-reality system and/or that may be accessed from one or more remote systems by the mixed-reality system in real-time, while the system and/or remote system(s) monitor/detect the pose/gestures associated with the controller(s) while the user interacts within the mixed-reality environments used to selectively render the control rays.

Turning to FIGS. 3-5E, it should be noted that a detected pose is not the only mechanism contemplated for selectively enabling or disabling a control ray in a mixed-reality environment. For example, it is within the scope of this disclosure that a control ray be selectively enabled or disabled based on other gestures, sequences of poses or gestures, or variables obtained from information detected about the user control. In this regard, it will be noted that the enabling is one or more of generating the control ray hologram, determining positioning information for rendering the control ray hologram in a mixed-reality environment, rendering the control ray hologram in the mixed-reality environment and/ or enabling functions or functionality associated with the control ray when the control ray is displayed within and/or interacts with one or more elements in the mixed-reality environment.

FIG. 3 illustrates an embodiment in which a mixed-reality system enables a control ray based on a sequence of gestures or poses of a user control. In particular, the mixed-reality system underlying the elements of FIG. 3 shown is configured to selectively enable a control ray 311 in response to detecting that a user's hand 310 switches from an open pose (pose 301 FIG. 3) to a closed pose (pose 303 of FIG. 3) and then back to an open pose (pose 305 of FIG. 3). As shown in pose 305 of FIG. 3, after the user's hand 310 has performed this gesture or sequence of predefined poses, the mixed-reality system renders a control ray 311 extending away from the palm of the user's hand 310 (as discussed above, this rendering configuration is non-limiting).

It will be recognized that other gestures or sequences of poses to selectively enable a control ray are possible. For example, a user may move their hand in an open pose from a position close to the user's body to a position fully extended from the user's body to trigger a control ray. In another example, a user may perform a sequence of predefined hand rotations or finger movements to selectively enable a control ray.

Furthermore, those skilled in the art will be appreciate that other constraints (e.g., time, motion characteristics) may be placed on a triggering gesture or sequence of poses to help ensure that a control ray is only selectively enabled when the user desires the enablement thereof (or that the control ray does not become enabled at an inconvenient or distracting time). For example, returning to the embodiment shown in FIG. 3, a mixed-reality system may be configured to only selectively enable a control ray 311 if the pose sequence depicted (open-closed-open) is performed within a predefined time interval. Continuing with another example mentioned above, if a user moves their hand in an open pose from a position close to the user's body to a position fully extended from the user's body, but the user's motion does not meet a motion characteristic threshold (e.g., a threshold velocity or acceleration requirement predefined by the system), a control ray will not be enabled because the user moved too slowly.

Figure 4:
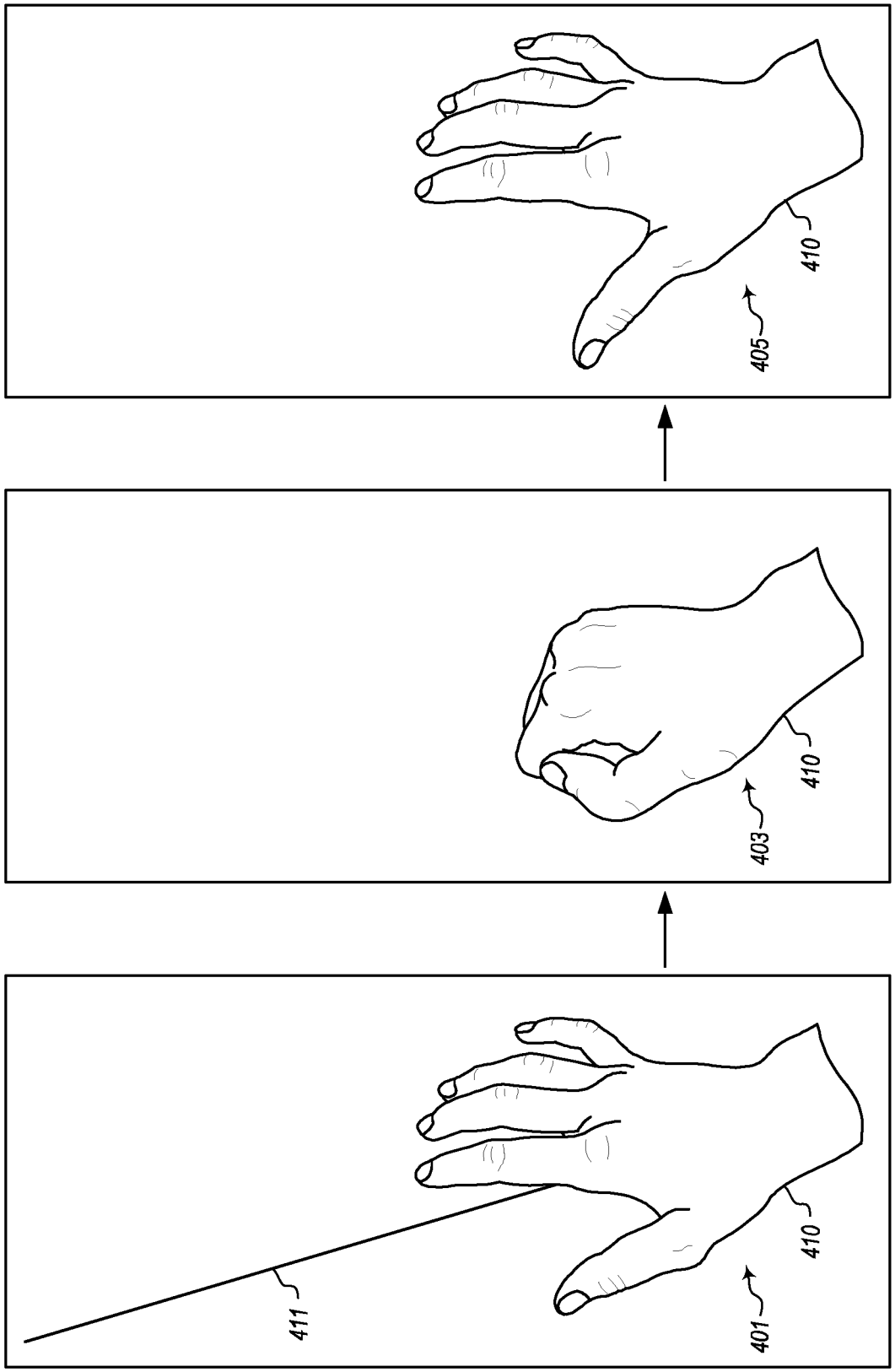
FIG. 4 illustrates a user hand in different poses/gestures and in which one of the poses/gestures corresponds to a control ray extending away from a user's hand.

Related to the embodiment shown in FIG. 3, FIG. 4 illustrates an embodiment in which a mixed-reality system selectively disables a control ray 411 based on a sequence of gestures or poses of a user control (hand 410). In particular, when the sequence defined previously in FIG. 3 (open-closed-open) is performed when a control ray is already activated (see pose 401 of FIG. 4), the system selectively disables the control ray 411 and ceases to render the control ray (see pose 405 of FIG. 4).

It will be recognized by those skilled in the art that alternative gestures or sequences of poses may be utilized to selectively disable a control ray, such as a user shaking or waving their hand 410 to remove the ray or holding a certain pose or orientation for a predetermined time (or those mentioned above in connection with selectively enabling a control ray). Furthermore, those skilled in the art will appreciate that additional constraints such as those mentioned in connection with the selective enabling of a control ray (such as time, motion characteristics, etc.) may be implemented for the selective disabling of a control ray.

Additionally, it should be noted that a mixed-reality system may selectively enable or disable a control ray based on other input received from a user, such as by voice activation, eye movement, menu input selection, or other means. Those skilled in the art will recognize that input not particularly associated with the user control (e.g., voice control, eye movement) may be utilized to disable a control ray in a variety of scenarios, even where the triggering of a control ray is predicated on detecting a user control performing and/or maintaining a particular pose.

Attention is now directed to FIGS. 5A-5E illustrate an embodiment in which a mixed-reality system selectively enables or disables a control ray based on a control ray activation variable.

After a control ray 511 has been selectively enabled and is being rendered in the mixed-reality environment (see FIG. 5A), it is often beneficial for a mixed-reality system to selectively disable control rays 511 without first receiving explicit user input for disabling the control rays (e.g., when the user points the control ray in a direction where a user could not or would not cognizably interact with virtual content). FIGS. 5A-5E depict an embodiment in which the mixed-reality system obtains a control ray activation variable associated with a user control (the user's hand 510, as depicted in FIGS. 5A-5E) and selectively enables or disables the display and/or processing of a control ray based 511 on whether the control ray activation variable exceeds a predetermined threshold.

In some embodiments, the control ray activation variable is based on a relationship between multiple values obtained by sensors 820, 830. For example, the control ray activation variable may be based on a degree of directional similarity between an orientation of the user control (e.g., the direction in which a control ray 511 would point if enabled) and a user's gaze location (illustratively depicted by user gaze location vector 521). In some embodiments, the control ray activation variable is a dot product between an orientation of the user control and a user gaze vector 521, to assess the directional similarity between the two. A system may define a threshold control ray activation variable value (e.g., a dot product value) such that when the control ray activation variable exceeds the threshold, the control ray is enabled, but when the control ray activation variable fails to exceed the threshold, the control ray 511 is disabled. In such an implementation, if a control ray 511 would point in a direction where it would not be useful to a user, or where it would be potentially distracting (such as out of a user's field of view or gaze location), the mixed-reality system ceases to render and/or process the control ray 511.

In some embodiments, the control ray activation variable is determined based on information derived from the pose, motion characteristics, or other attributes of the user control. In an illustrative embodiment, a control ray activation variable and applicable threshold are based on a spatial or an angular relationship between individual members (e.g., the user's fingers) of the user control 510, such that where the individual members would impede the control ray 511, the mixed-reality system selectively disables the control ray 511. In another illustrative embodiment, a control ray activation variable and applicable threshold are based on the velocity or acceleration of the user control 510, such that when the user quickly shakes or waves the user control 510, the mixed-reality system selectively disables the control ray 511 to avoid a distracting rendering of the control ray.

Figure 5A:
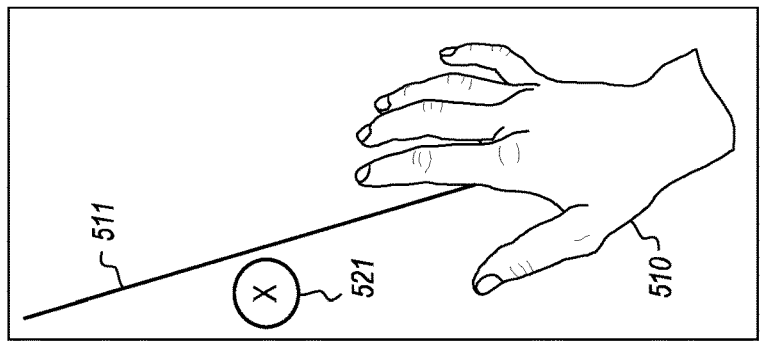
FIGS. 5A-5E illustrates a user hand in different poses/gestures and in which two of the poses/gestures corresponds to a control ray extending away from a user's hand.
Figure 5B:
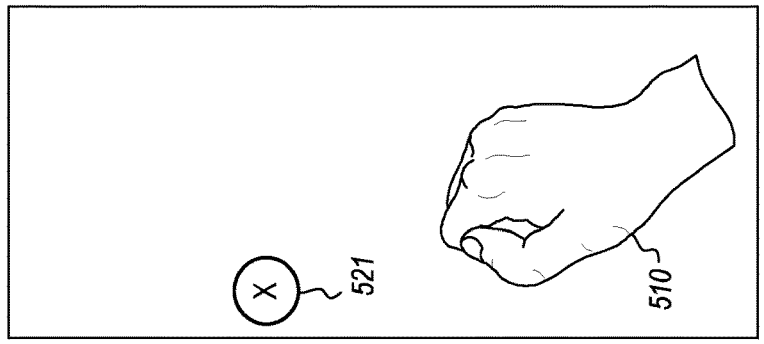
Figure 5C:
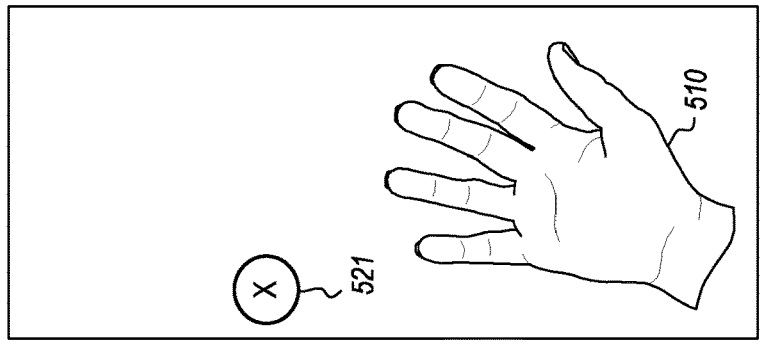
Figure 5D:
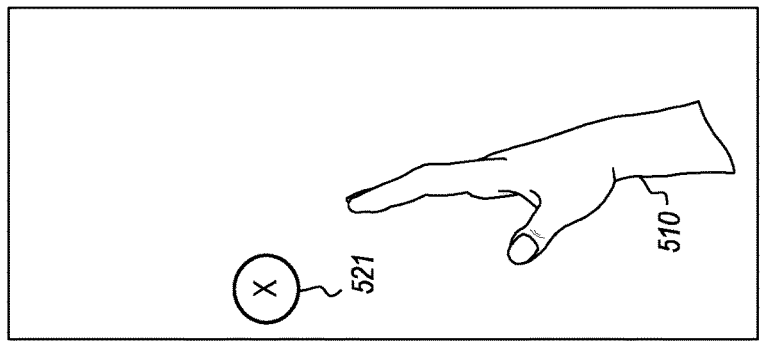
Figure 5E:
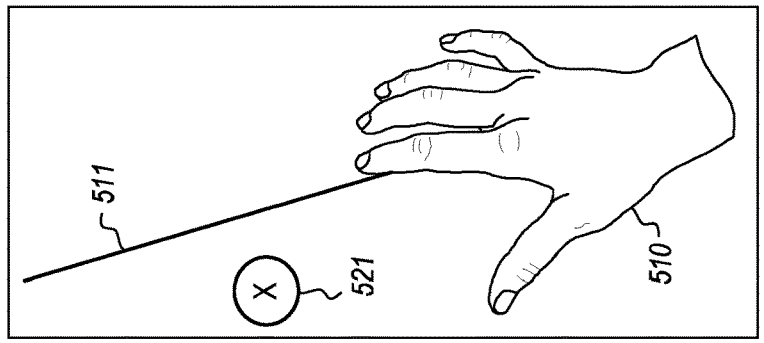

An illustration of the exemplary embodiments described in the preceding two paragraphs is provided in FIGS. 5A-5E. FIG. 5A illustrates a control ray 511 that has been activated and is extending away from the palm of the user's hand 510. FIGS. 5B, 5C, and 5D illustrate situations where a first control ray activation variable and first threshold are based on a dot product between the orientation of the user's hand 510 (e.g., where the control ray would point if enabled) and the user's gaze vector 521, and a second control ray activation variable and second threshold are based on the pose of the user's hand (e.g., the control ray activation variable is based on the openness of the user's hand). It will be appreciated that any number of control ray activation variables associated with the selective enabling or disabling of a control ray, according to the present disclosure.

In FIGS. 5B and 5C, the orientation of the user's hand 510 points outside of the user's field of view and gaze direction. Consequently, the dot product between the orientation of the user's hand 510 and the user's gaze vector 521 is small, and the first control ray activation variable fails to exceed the first threshold. Therefore, the mixed-reality system selectively disables the control ray 511, even though the second control ray activation variable may meet the second threshold (i.e., the user's hand 510 is not in a closed position).

In FIG. 5D, the user's hand 510 is in a closed position, and thus the second control ray activation variable fails to exceed the second threshold corresponding to the openness of the user's hand 510. Consequently, the mixed-reality system selectively disables the control ray 511, even though the first control ray activation variable may meet the first threshold (i.e., the orientation of the user's hand points in the user's gaze location).

In FIG. 5E, the user has again positioned their hand 510 such that the orientation of the user's hand 510 points to a location within the user's field of view and gaze location and the user's hand 510 is in an open position. Accordingly, the first control ray activation variable meets the first threshold and the second control ray activation variable meets the second threshold. Thus, the mixed-reality system selectively enables the control ray 511 in FIG. 5E. Put differently, in some embodiments, the control ray 511 is selectively enabled when all control ray activation variables meet their respective thresholds, and the control ray 511 is selectively disabled when any control ray activation variable fails to meet/exceed its applicable threshold.

In some instances, different gestures may also be used/detected to modify functionality associated with a control ray, even after the control ray has been selectively activated. This modification may include changing a display attribute of the control ray (e.g., color, size, line type, animation, etc.), as well as enabled functionality associated with the control ray (e.g., edit mode, select mode, move mode, etc.).

Those skilled in the art will appreciate that the aspects of the foregoing disclosure may be implemented independently or in combination. In particular, control ray activation variables and thresholds may be used in conjunction with triggering poses and/or gestures to selectively enable or disable control rays in a mixed-reality environment. By way of example, after a mixed-reality system detects a predefined pose/gesture of a user control for selectively generating a control ray, the mixed-reality system may detect that a control ray activation variable fails to exceed an applicable threshold and therefore refrain from generating/rendering the control ray in the mixed-reality environment.

Attention is now directed to FIG. 6, which illustrates an embodiment in which a mixed-reality system enables additional user control functionality based on whether a control ray 611 is enabled or disabled. As illustrated, a user control ray 611 has been selectively enabled, with the control ray 611 extending away from the user's index finger 613 based on the pose of the user's hand with an index finger 613 extended. In scene 601 of FIG. 6, the user directs the control ray 611 to a box 651 in the mixed-reality environment. In scene 603, the user has triggered an interaction (function) with the box (by moving their index finger 613 toward their thumb 615) and is manipulating the position of the box 651 wherein the box 651 follows the motion of the user's hand 610 after the user has triggered the interaction (e.g., the user can pick up the box 651 from a distance by moving their hand while in the interactive position).

Without the control ray 611 activated, in some embodiments, if the user performed the gesture of moving their index finger 613 toward their thumb 615, the user would have failed to trigger an interaction with the box 651 (e.g., the user would be too far away to trigger such an interaction). In other embodiments, even if the user was positioned closer to the box 651, a different gesture would be required of the user to manipulate the position of the box 651 in the same manner (e.g., the user would be required to grab the box 651 with an open hand in order to pick it up).

In other embodiments, different gestures will trigger the generation of different types of control rays that may be used for pointing, but not for interacting with (e.g., moving) the object.

Accordingly, FIG. 6 illustrates that a mixed-reality system, in some embodiments, selectively enables additional user control functionality for user interaction within the mixed-reality environment based on whether the control ray 611 (of a type that is associated with that functionality) is enabled or disabled. Those skilled in the art will appreciate that other functionality may be enabled by the state of the control ray (whether enabled or disabled), such as specialized distance commands that are unavailable for nearby objects.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
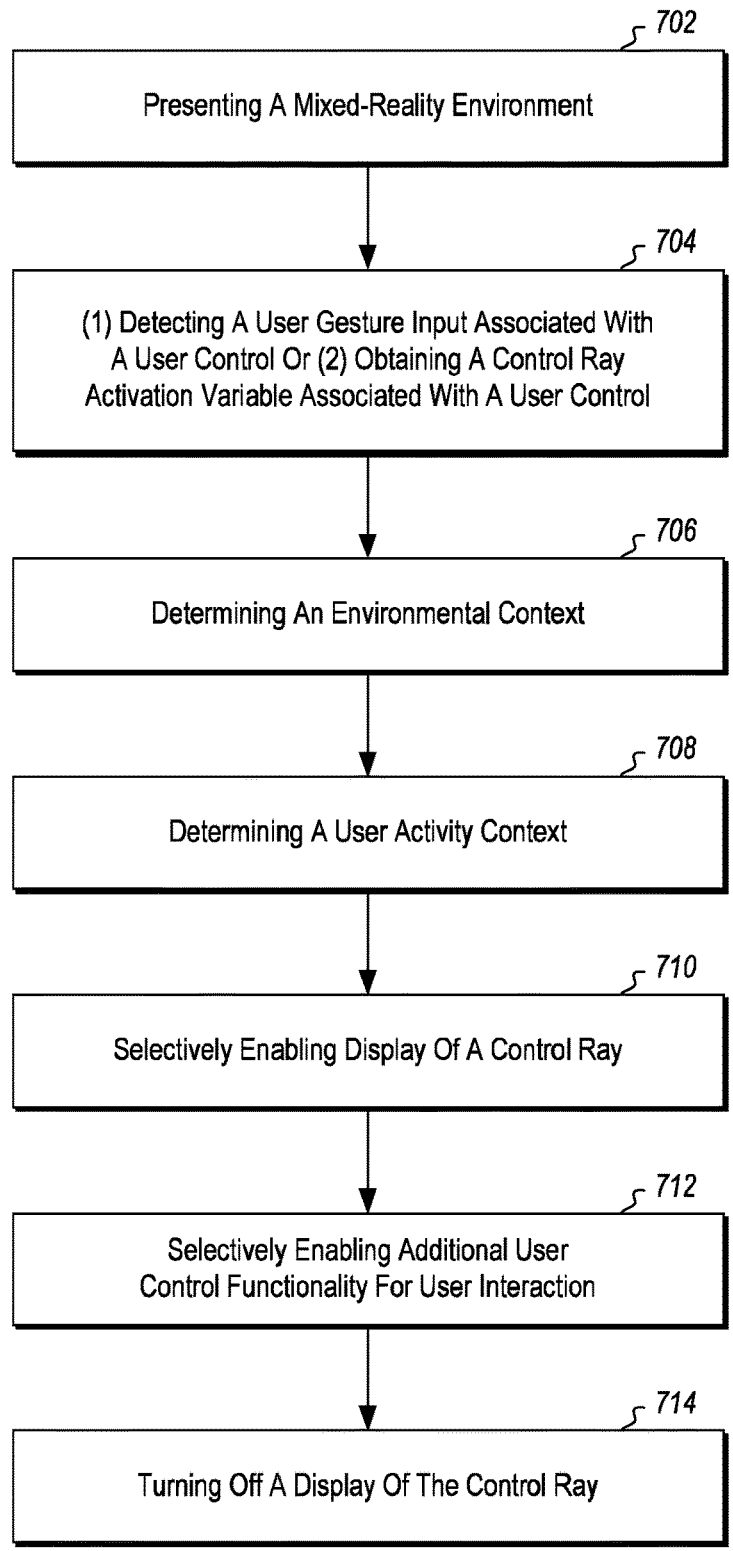
FIG. 7 shows an exemplary flow diagram associated with methods for selectively enabling generation and display of control rays in a mixed-reality environment.

FIG. 7 shows an exemplary flow diagram depicting a method 700 for selectively enabling generation and display of control rays in a mixed-reality environment. Method 700 includes acts for presenting a mixed-reality environment (702), (1) detecting a user gesture input associated with a user control or (2) obtaining a control ray activation variable associated with a user control (704), determining an environmental context (706), determining a user activity context (708), selectively enabling display of a control ray (710), selectively enabling additional user control functionality for user interaction (712), and turning off a display of the control ray (714).

Act 702 of method 700 includes presenting a mixed-reality environment. In some embodiments, this includes presenting one or more holograms which a user in the mixed-reality environment may interact with.

Act 704 of method 700 includes (1) detecting a user gesture input associated with a user control or (2) obtaining a control ray activation variable associated with a user control. As to (1), in some embodiments the user gesture includes a predefined pose, sequence of poses or gestures, or other movement that meets predefined conditions (e.g., conditions of timing, velocity, etc.), or even voice or other commands (e.g., eye movement). As to (2), the control ray activation variable may be based on a function including values obtained by sensors 820, 830 of the mixed-reality system, such as a dot product between an orientation of a user control and a user gaze vector, or spatial or angular relationships between individual control members of a user control. In either (1) or (2), the user control includes, in some instances, at least a part of the user's body, such as a hand or finger of the user.

Act 706 of method 700 includes determining an environmental context, which may include determining a mixed-reality environment type. In some embodiments, a mixed-reality environment includes certain environmental contexts in which it is not beneficial or desirable for users to be able to enable control rays (e.g., in a scenario where several users share a visual and a ray would be distracting) and other environmental contexts in which it is beneficial and desirable for users to be able to enable control rays. Thus, in some embodiments, some environmental contexts within a mixed-reality environment allow for control rays to be enabled, whereas others do not. The mixed-reality system, in some implementations, determines the environmental context before deciding whether to selectively enable a control ray.

Act 708 of method 700 includes determining a user activity context. Similar to the aforementioned environmental contexts, a mixed-reality environment may include certain user activities and the identification of a type of user, wherein it may not be beneficial or desirable for certain users (or all users) to be capable of enabling all types or certain types of control rays (e.g., when a user is playing a mini-game or executing fine-tuned controls on nearby objects). Thus, in some embodiments, some user activity contexts within a mixed-reality environment allow for control rays to be enabled, whereas others do not. The mixed-reality system, in some embodiments determines the user activity context before deciding whether to selectively enable a control ray.

Act 710 of method 700 includes selectively enabling display of a control ray. The mixed-reality system may selectively enable a control ray depending on a variety of factors, whether singly or in combination, such as whether the system detected a user gesture, whether a detected control ray activation variable exceeds an applicable predetermined threshold, whether a determined environmental context allows for control rays to be selectively enabled, or whether a determined user activity context allows for control rays to be selectively enabled. If the predefined condition(s) is/are met, the mixed-reality system enables a control ray and displays it extending away from the user control within the mixed-reality environment as a hologram.

This act, act 710, may include referencing a mapping of control ray types with contexts, users, gestures/poses, control ray functionalities, etc., to determine which one or more control ray is appropriate and matches the particular context, user, gesture, and/or functionality to be applied in an instance.

Act 712 of method 700 includes selectively enabling additional user control functionality for user interaction. As mentioned in connection with FIG. 6, in some instances, the mixed-reality system selectively enables additional user control functionality for interacting with one or more holograms in the mixed-reality environment (such as specialized distance commands that are unavailable for nearby objects) based on whether the control ray is enabled or disabled and based on the type of control ray.

Finally, act 714 of method 700 includes turning off a display of the control ray. In some embodiments, the mixed-reality system turns off, disables, terminates, or ceases to or refrains from displaying the control ray in response to detecting one or more corresponding triggering events, such as a user pose, sequence of poses, gesture, environmental context, user activity context, a control ray activation variable failing to exceed a threshold, or other user input such as voice commands or eye movement, and/or any other factor(s) described herein.

The disclosed embodiments may, in some instances, provide various advantages over conventional systems and methods for utilizing control rays in mixed-reality environments. Some of these advantages include providing users with the ability to selectively enable or disable control rays with input commands, and providing users with a system that will selectively disable control rays in response to triggering events (such as when control ray activation variables fail to meet certain thresholds) and/or in contexts (e.g., user activity, environmental) that indicate that a control ray would reduce the quality of the user experience.

Figure 8:
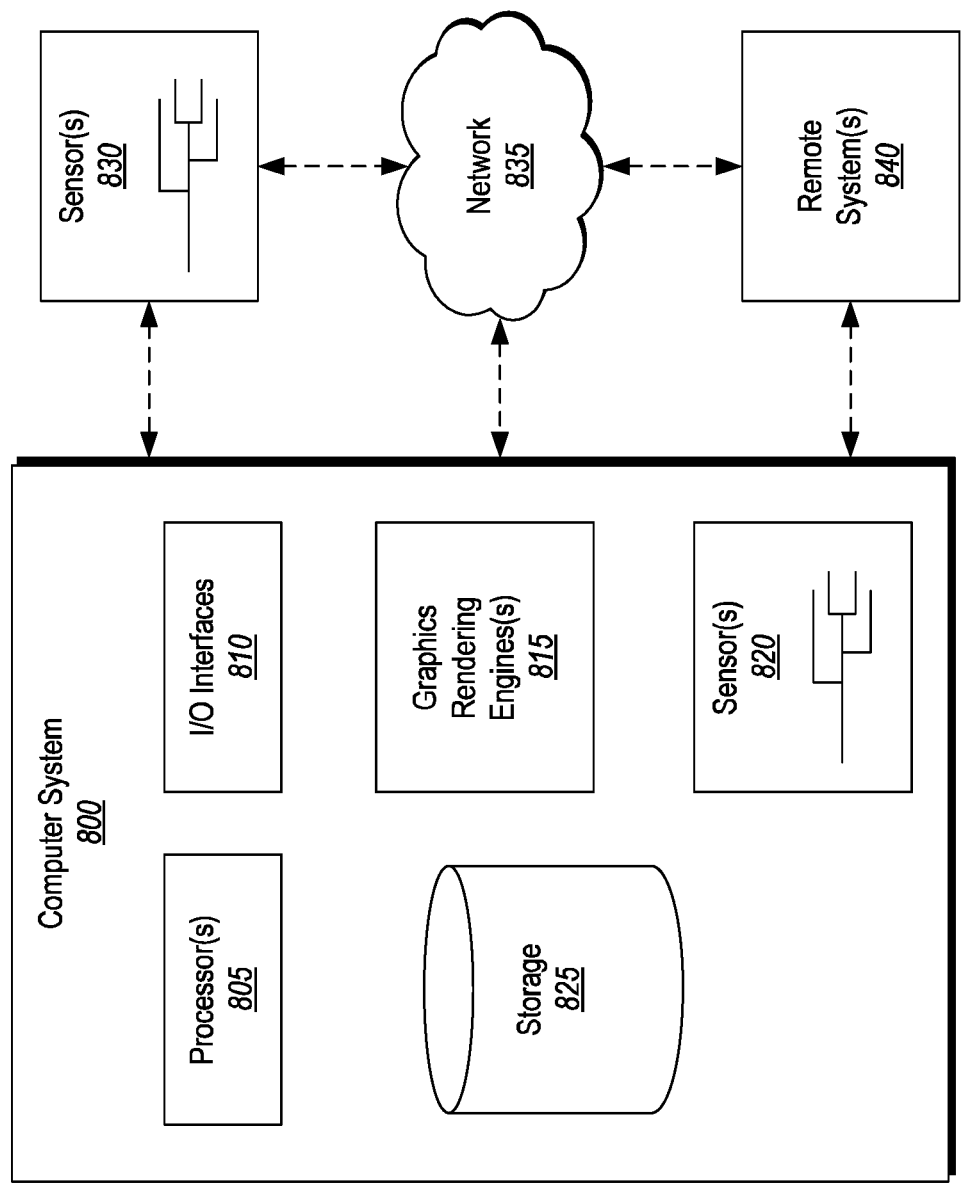
FIG. 8 illustrates an exemplary computer system that may include or be used to perform at least a portion of the embodiments disclosed herein.

Having just described the various features and functionalities of some of the disclosed embodiments, attention is now directed to FIG. 8, which illustrates an example computer system 800 that may be used to facilitate the operations described herein.

The computer system 800 may take various different forms. For example, in FIG. 8, the computer system 800 is embodied as a head-mounted display (HMD). Although the computer system 800 may be embodied as a HMD, the computer system 800 may also be a distributed system that includes one or more connected computing components/devices that are in communication with the HMD. Accordingly, the computer system 800 may be embodied in any form and is not limited strictly to the depiction illustrated in FIG. 8. By way of example, the computer system 800 may include a projector, desktop computer, a laptop, a tablet, a mobile phone, server, data center and/or any other computer system.

In its most basic configuration, the computer system 800 includes various different components. For example, FIG. 8 shows that computer system 800 includes at least one hardware processing unit 805 (aka a "processor"), input/output (I/O) interfaces 810, graphics rendering engines 815, one or more sensors 820, and storage 825. More detail on the hardware processing unit 805 will be presented momentarily.

The storage 825 may be physical system memory, which may be volatile, non-volatile, or some combination of the two. The term "memory" may also be used herein to refer to non-volatile mass storage such as physical storage media. If the computer system 800 is distributed, the processing, memory, and/or storage capability may be distributed as well. As used herein, the term "executable module," "executable component," or even "component" can refer to software objects, routines, or methods that may be executed on the computer system 800. The different components, modules, engines, and services described herein may be implemented as objects or processors that execute on the computer system 800 (e.g. as separate threads).

The disclosed embodiments may comprise or utilize a special-purpose or general-purpose computer including computer hardware, such as, for example, one or more processors (such the hardware processing unit 805) and system memory (such as storage 825), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 800 may also be connected (via a wired or wireless connection) to external sensors 830 (e.g., one or more remote cameras, accelerometers, gyroscopes, acoustic sensors, magnetometers, etc.). It will be appreciated that the external sensors include sensor systems (e.g., a sensor system including a light emitter and camera), rather than solely individual sensor apparatuses. Further, the computer system 800 may also be connected through one or more wired or wireless networks 835 to remote systems(s) 840 that are configured to perform any of the processing described with regard to computer system 800.

During use, a user of the computer system 800 is able to perceive information (e.g., a mixed-reality environment) through a display screen that is included among the I/O interface(s) 810 and that is visible to the user. The I/O interface(s) 810 and sensors 820/830 also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

The graphics rendering engine 815 is configured, with the hardware processing unit 805, to render one or more virtual objects within the scene. As a result, the virtual objects accurately move in response to a movement of the user and/or in response to user input as the user interacts within the virtual scene.

A "network," like the network 835 shown in FIG. 8, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 800 will include one or more communication channels that are used to communicate with the network 835. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RANI and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally or alternatively, the functionality described herein can be performed, at least in part, by one or more hardware logic components (e.g., the hardware processing unit 805). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for selectively enabling a display of a control ray in a mixed-reality environment, the system comprising:
   one or more processors; and
   one or more computer-readable media having stored thereon computer-executable instructions that are executable by the one or more processors to configure the system to perform the following:
   present a mixed-reality environment to a user with a mixed-reality display device, the mixed-reality environment including one or more holograms;
   obtain a first control ray activation variable associated with a user control, the user control including at least a hand of the user, the first control ray activation variable being based on a function of one or more spatial or angular relationships between individual control members of the user control measuring an openness of the hand of the user;
   obtain in a second control ray activation variable associated with the user control, the second control ray activation variable comprising a velocity or acceleration of the user control;
   in response to determining that (i) the first control ray activation variable meets or exceeds a predetermined threshold and (ii) the second control ray activation variable does not exceed a second predetermined threshold, selectively enable display of a control ray within the mixed-reality environment, the control ray being rendered as a hologram of a line extending away from the user control within the mixed-reality environment, wherein the control ray is rendered, upon the display thereof being selectively enabled in response to the first control ray activation variable meeting or exceeding the predetermined threshold and the second control ray activation variable not exceeding the second predetermined threshold, with an orientation that is based on an axial alignment of at least a portion of the user control; and
   in response to determining that the first control ray activation variable fails to meet or exceed the predetermined threshold or the second control ray activation variable exceeds the second predetermined threshold, selectively disable display of or refrain from displaying the control ray within the mixed-reality environment.

2. The system of claim 1, wherein the computer-executable instructions are further operable to configure the system to determine an environmental context, wherein the control ray is only selectively enabled upon determining that the environmental context allows for control rays to be enabled and wherein at least one context in the mixed-reality environment allows for control rays to be enabled and at least one context in the mixed-reality environment refrains from allowing control rays to be enabled.

3. The system of claim 1, wherein the computer-executable instructions are further operable to configure the system to determine a user activity context, wherein the control ray is only selectively enabled upon determining that the user activity context allows for control rays to be enabled.

4. The system of claim 1, wherein the computer-executable instructions are further operable to configure the system to selectively enable additional user control functionality for interacting with one or more holograms in the mixed-reality environment based on whether the control ray is enabled or disabled.

5. The system of claim 1, wherein the computer-executable instructions are further operable to configure the system to turn off a display of the control ray within the mixed-reality environment in response to detecting an additional gesture associated with refraining from displaying the control ray.

6. A method for selectively enabling display of a control ray in a mixed-reality environment, the method comprising:
presenting a mixed-reality environment to a user with a mixed-reality display device, the mixed-reality environment including one or more holograms;
detecting a user gesture input associated with a user control during presentation of the mixed-reality environment, the user control including at least a part of a body of the user;
in response to detecting the user gesture input, selectively generating and displaying a control ray as a hologram of a line extending away from the user control within the mixed-reality environment with an orientation that is based on an axial alignment of at least a portion of the user control;
obtaining a control ray activation variable associated with a user control, the user control including at least part of a user's body, the control ray activation variable comprising a dot product between an orientation of the user control and a user gaze vector;
obtaining a second control ray activation variable associated with the user control, the second control ray activation variable comprising a velocity or acceleration of the user control; and after selectively generating and displaying the control ray in response to detecting the user gesture input within the mixed-reality environment, and in response to determining that (i) the dot product between the orientation of the user control and the user gaze vector fails to meet or exceed a predetermined threshold or (ii) the second control ray activation variable exceeds the second predetermined threshold, selectively disabling display of the control ray within the mixed-reality environment.

7. The method of claim 6, wherein the user control comprises a hand or finger of the user.

8. The method of claim 6, further comprising: determining an environmental context, wherein the control ray is only selectively enabled upon determining that the environmental context allows for control rays to be enabled and wherein at least one context in the mixed-reality environment allows for control rays to be enabled and at least one context in the mixed-reality environment refrains from allowing control rays to be enabled.

9. The method of claim 6, further comprising:
determining a user activity context, wherein the control ray is only selectively enabled upon determining that the user activity context allows for control rays to be enabled.

10. The method of claim 6, further comprising:
selectively enabling additional user control functionality for interacting with one or more holograms in the mixed-reality environment based on whether the control ray is enabled or disabled.

11. The method of claim 6, further comprising:
turning off a display of the control ray within the mixed-reality environment in response to detecting an additional gesture associated with refraining from displaying the control ray.

* * * * *